Feb. 9, 1943.  C. R. STOUT  2,310,814
PORTABLE MOTOR DRIVEN CREAM SEPARATOR
Filed Sept. 23, 1940  3 Sheets-Sheet 1
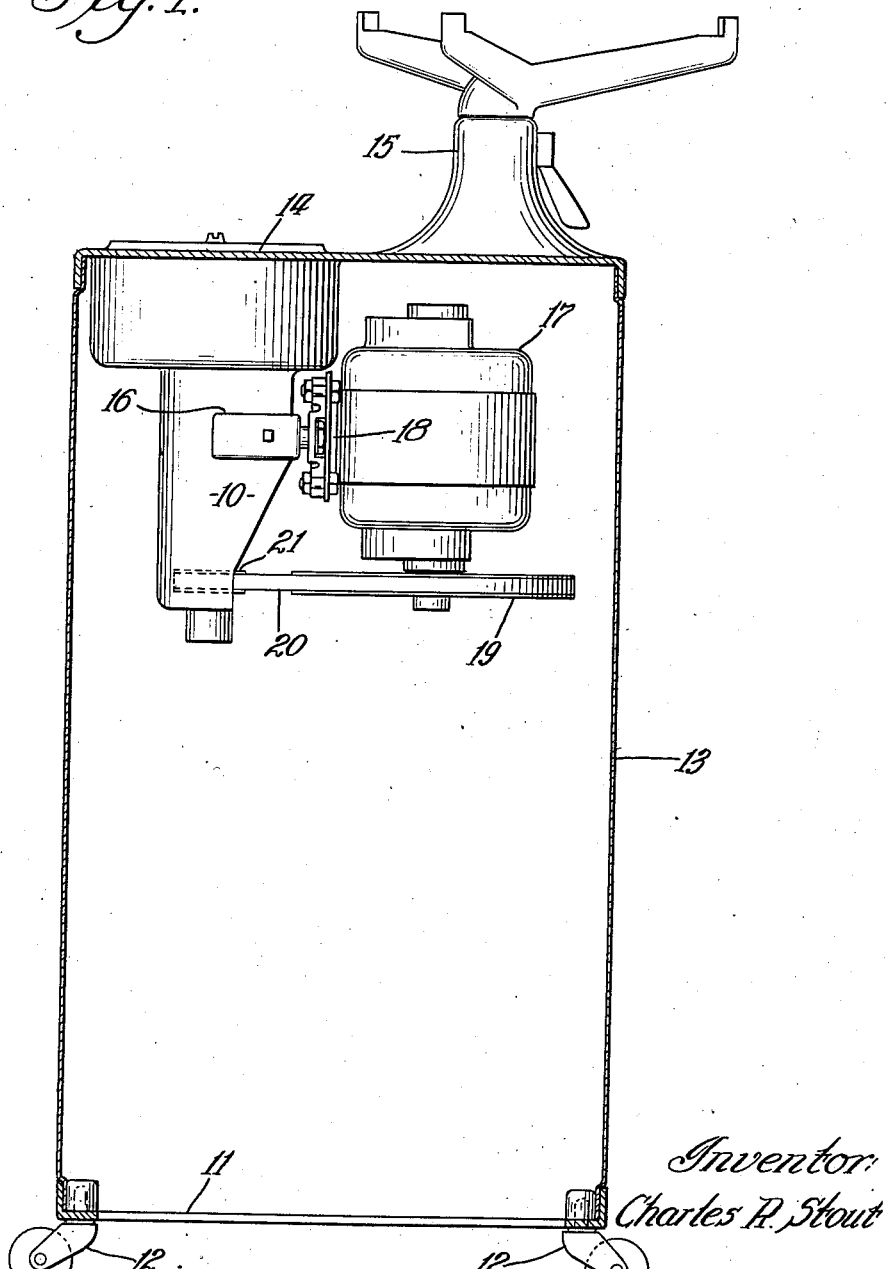

Feb. 9, 1943. C. R. STOUT 2,310,814
PORTABLE MOTOR DRIVEN CREAM SEPARATOR
Filed Sept. 23, 1940 3 Sheets-Sheet 2
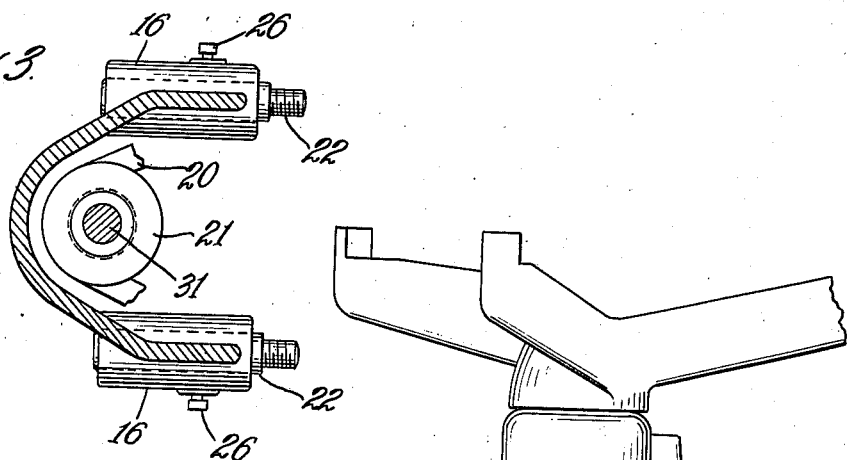
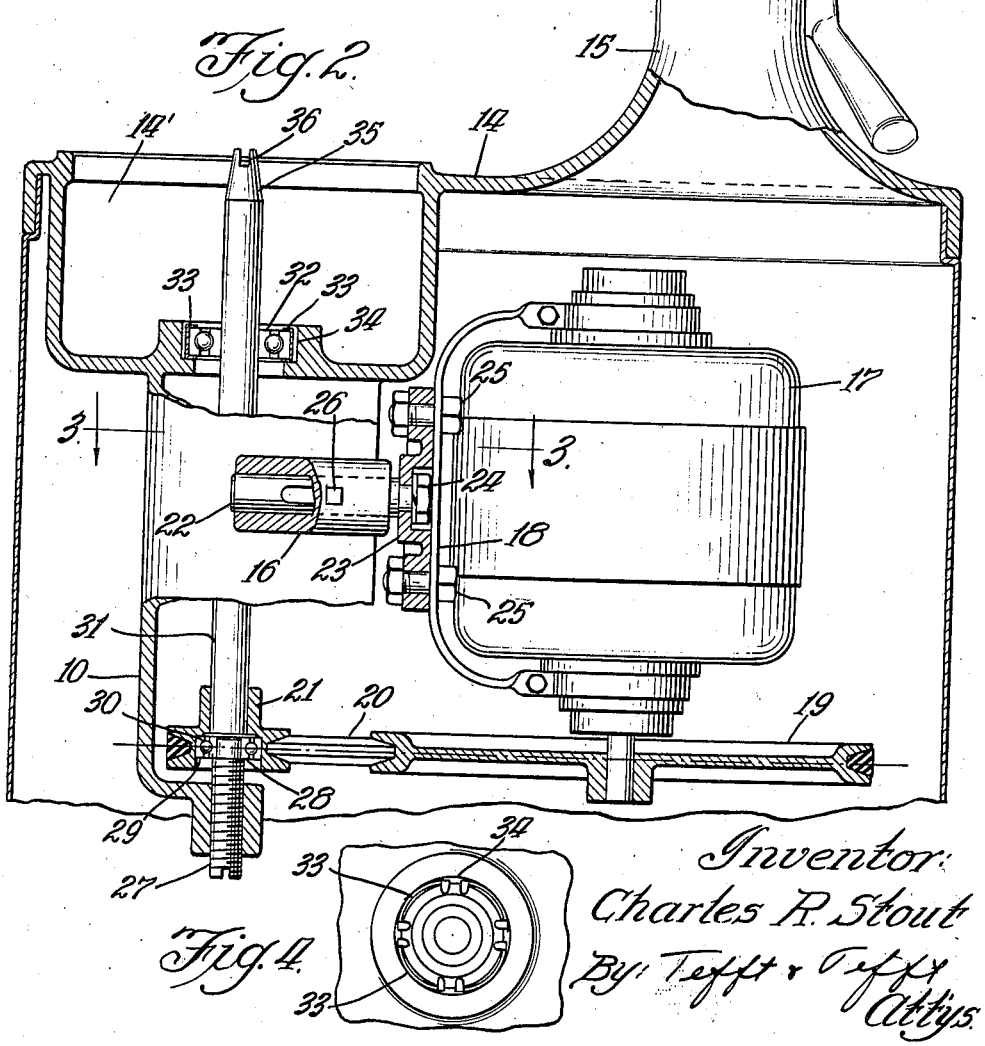
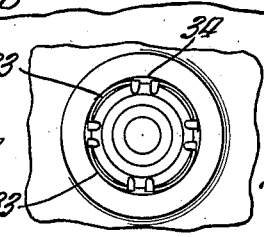
Inventor:
Charles R. Stout
By Tefft & Tefft
Attys.

Feb. 9, 1943.   C. R. STOUT   2,310,814
PORTABLE MOTOR DRIVEN CREAM SEPARATOR
Filed Sept. 23, 1940   3 Sheets-Sheet 3

Inventor
Charles R. Stout
By Tefft & Tefft
Attys.

Patented Feb. 9, 1943

2,310,814

UNITED STATES PATENT OFFICE 2,310,814

PORTABLE MOTOR DRIVEN CREAM SEPARATOR

Charles R. Stout, Waterloo, Iowa, assignor to Clifford E. Butler, Waterloo, Iowa Application September 23, 1940, Serial No. 357,872

2 Claims. (Cl. 233—24)

This invention relates to improvements in centrifugal machines and although it may have wider application, it will be disclosed and described as applied to the improved construction of a conventional type portable cream separator driven by an electric motor through pulleys and a belt.

Heretofore such machines have been commonly driven by a hand crank requiring rather heavy labor and involving rather expensive precision reduction gearing. It will be appreciated that in this older type crank driven cream separator with its high speed separating bowl the machine should be securely bolted to a solid foundation to withstand the stresses of hand cranking and to maintain the spindle in true vertical alignment and to maintain the bowl balance as required by the older conventional machines.

The expansion of rural electrification has developed the need for an inexpensive and effective motor driven cream separator and the improvements in rural housing and farm buildings has indicated that for maximum utility such separators should be readily portable.

Many attempts have been made to provide a structure for a motor driven separator of this kind, but generally the results have fallen short of commercial success because of high cost or mechanical difficulties. Direct motor drives have required troublesome high torque, high cost motors: belt drives have developed balancing troubles due to synchronizing impulses on the bowl spindles by inaccurate belts and pulleys, plus the effect of improper belt tension. Flexible spindles to permit center of mass rotation of the bowl required high uniform precision and high cost spindles that were too delicate and short lived for cream separators subject to wide variations in the installations and involving radical changes in temperature and other conditions.

The particular object of this invention is to provide a sturdy, low cost and effective spindle structure for cream separators adapted to be motor driven through belt and pulleys.

Another object is to provide a spindle structure for motor and belt driven separators which will be sufficiently sturdy and effective to permit portable mounting the separator on caster wheels.

Still further objects and benefits will be disclosed in the following descriptions and drawings in which:

Fig. 1 is a side elevational cross sectional view of the preferred embodiment of my invention showing the general arrangement of the parts;

Fig. 2 is an enlarged top section of Fig. 1 with parts of the bowl spindle frame broken away to better reveal the construction;

Fig. 3 is a horizontal section of the spindle frame on the section lines 3—3 of Fig. 2 to show details of the adjustable motor support;

Fig. 4 is a top plan view of the upper spindle bearing showing the springs which provide flexibility in this bearing.

Figure 5:
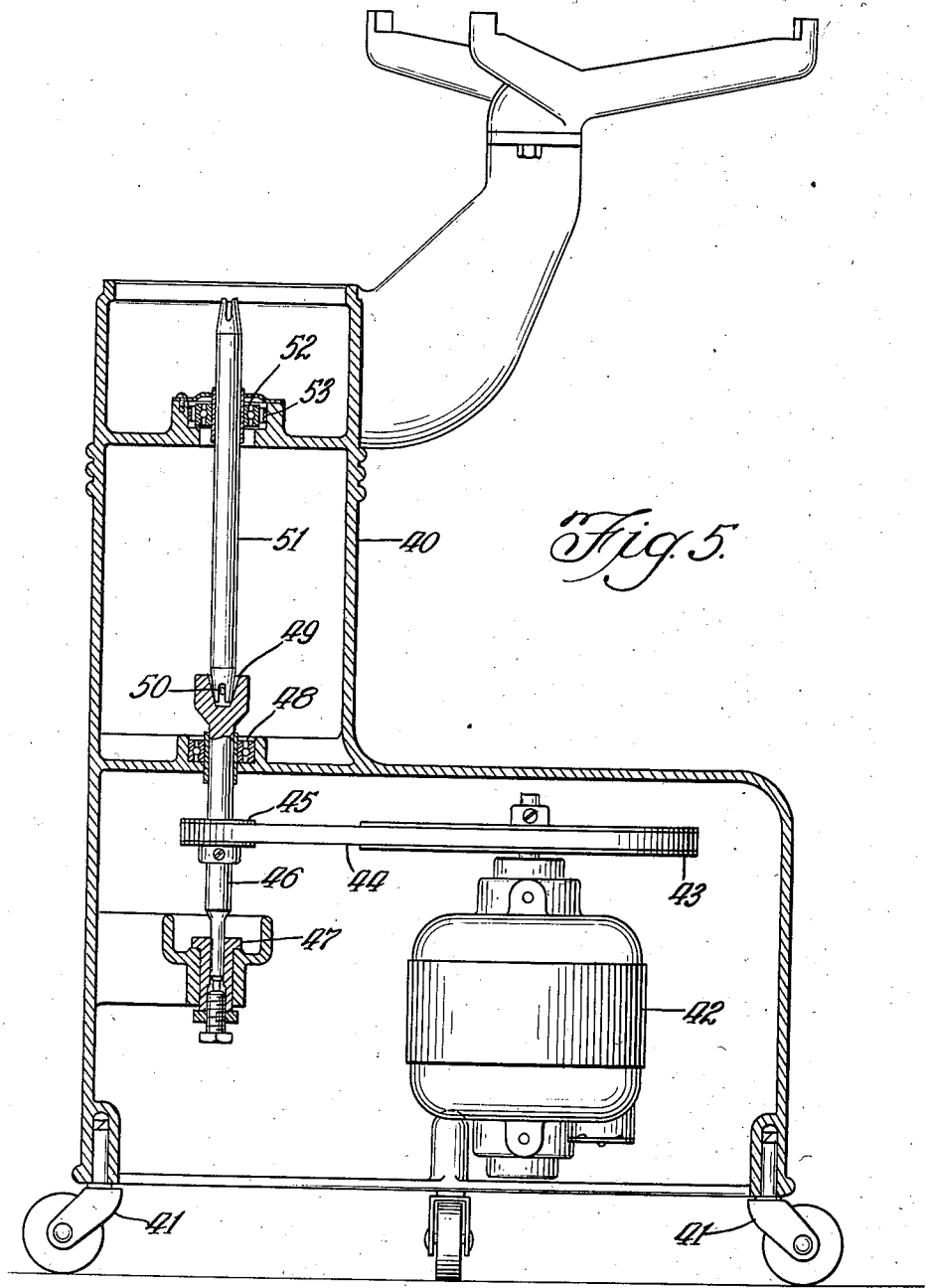
Fig. 5 is a side elevational cross section of an optional structure which will hereinafter be further explained.

Now referring to the drawings and at the outset particularly to Fig. 1, I designate the bowl spindle frame generally by the numeral 10. This spindle frame is supported from a base 11 equipped with caster wheels 12 through an enclosing cabinet member 13, as shown. The spindle frame 10 has a top section 14 with a recess opening 14' to receive the separator bowl (not shown) and a supply tank bracket 15 to support a supply tank (not shown). On the sides of the spindle frame 10, as clearly shown in Fig. 3, are dual bosses 16 to support a motor 17 from a conventional base 18. On the shaft of the motor is mounted a relatively large pulley 19 driving a proportionately smaller pulley 21 on the bowl spindle through a conventional V-belt 20. Although I have shown a common form of stamped sheet metal base 18 on the motor 17 which has some slight flexibility, it will be appreciated that I can similarly support the motor by a U-shaped base attached to the motor through more flexible rubber mountings inserted over the bearing hubs of the motor. This construction is well known in the art and requires no further explanation except that I desire to point out that for purposes which will hereafter be explained, I desire the motor to be mounted somewhat flexibly.

Now referring to Figs. 2 and 3, I show adjustable shoulder studs 22 mounted in the bosses 16 and on these studs is mounted a motor support bracket 23 firmly attached on the shoulder studs 22 by lock nuts 24. The motor bracket 23 attaches to the base of the motor 18 by bolts 25. Inserted through the sides of the support bosses 16 are set screws 26 which permit lateral adjustment of the motor 17 by sliding the complete assembly outward and fastening by the set screws 26. This adjustment structure will be well understood, it being my object to provide means to adjust the tension of the belt 20 in order to provide a smoothly running belt. Although by the foregoing description I have disclosed a conventional type of manual adjustment, it will be appreciated that under certain conditions an automatic type of adjustment may be required and under these conditions I propose to use an optional structure wherein the support studs 22 are forced outwardly by a spring, thus providing a constant belt tension.

Threaded in the lower end of the spindle frame 10 is a shoulder adjustment screw 27 which supports the bowl spindle and provides vertical adjustment, as will be well understood in the art. The shoulder screw 27 supports the inner race 28 of the ball bearing adapted for ball thrust and radial loads. The complete ball bearing is pressed into the recess of the pulley 21 which is in turn pressed on the end of the bowl spindle 31. It will be appreciated that the balls 30 in this ball bearing support all the thrust and radial loads imposed at this point, and it will be further appreciated that I have arranged to have the center line of this ball bearing coincide with the center line of the pulley and belt so that all thrust of the belt is taken on the center line of the balls in the bearing. By this structure the unbalancing effects of the belt drive are minimized and free pivotal rotation of the spindle shaft 31 is permitted because of the flexibility between the inner and outer races of this bearing, as will be well understood in the art. The bearing being inserted within the pulley 21 may be effectively sealed and lubrication retained therein.

The upper end of the spindle shaft 31 is flexibly supported by the ball bearing 32 by means of the springs 33 inserted in the recess 34, as is well illustrated in Fig. 4. It will be appreciated that this flexible mounting of the ball bearing 32 permits free top-spinning rotation of the spindle shaft 31 and thereby provides structure to permit the bowl (not shown) to rotate about its center of mass rather than its geometric center. The bowl is mounted and driven in a conventional manner on top of the spindle 31 by means of the tapered end 35 and the slot 36 engaging a cross pin in the female section of the bowl, as is well understood in the art.

Now referring to Fig. 5, I show an optional structure along somewhat more conventional lines than my preferred embodiment, as shown in Fig. 1. In this arrangement the bowl spindle frame 40 extends to the floor and is supported on caster wheels 41. A conventional motor 42 is slidably mounted in the frame 40 to provide belt tension adjustment for the belt 44 mounted on pulleys 43 and 45 as shown. The pulley 45 is mounted on a stub shaft 46 which is supported on a conventional step bearing 47 and a conventional ball bearing 48. The upper end of the stub shaft 46 is expanded and has a conical opening 49 somewhat wider in angle than the taper on the bowl spindle 51 which drives through a pin 50, as shown. The upper end of the bowl spindle is flexibly supported by the bearing 52 resiliently mounted by conventional bearing springs 53 similar to those shown and described in the preferred embodiment of my invention in Fig. 4.

It will be appreciated that the stub shaft 46 mounted in the bearings 47 and 48 and carrying a drive pulley 45 between the bearings provides a structure wherein the unbalancing effects of the belt 44 are absorbed in the spindle frame 40 through the bearings 47 and 48. The spindle 51 is pivotally supported in the conical opening 49 of the stub shaft 46, a structure which permits free top-spinning of the spindle from the tapered end of the spindle 51, as permitted by the flexible bearing 52 supported by the springs 53. This structure is more expensive and cumbersome than that shown in Fig. 1, but it will be recognized that by this structure I have provided means whereby the spindle 51 may be driven in a free top-spinning manner and without unbalancing interference from the drive belt 44.

From the foregoing description it will be appreciated that I have provided a structure involving a relatively short stiff bowl spindle to carry the separating bowl on its top and driven by a motor with a motor shaft and center line of the rotor parallel to this short spindle and shaft. The rotor bowl and shaft revolving about parallel axes creates a dual gyroscopic action change with an effective co-acting effect. The structure is such that a sturdy spindle frame may be constructed to carry all of the moving parts supported and enclosed by a cabinet structure which may be portably mounted on casters. The structure is such that it may be economically built and sold, and I thus provide a portable motor driven cream separator adapted for a wide market.

I claim:

1. In a cream separator, a spindle frame, a bowl spindle, a relatively small drive pulley mounted on the lower end of the spindle, a pivotal ball bearing inserted in the pulley with the center line of the bearing on the center line of the pulley groove, a spindle adjustment screw supporting the spindle from the inner race of the ball bearing, and a flexible spindle bearing mounted adjacent the upper end of the spindle, the structure permitting free pivotal spinning of the spindle from the lower ball bearing.

2. In a cream separator, a spindle frame, a bowl spindle, a relatively small drive pulley mounted on the lower end of the spindle, a pivotal ball bearing inserted in the pulley with the center line of the bearing on the center line of the pulley groove, a spindle adjustment screw supporting the spindle from the inner race of the ball bearing, a flexible spindle bearing mounted adjacent the upper end of the spindle, the structure permitting free pivotal spinning of the spindle from the lower ball bearing, a drive motor flexibly mounted in a base, said base being adjustably mounted on the frame for parallel movement to the bowl spindle, a large diameter drive pulley mounted on the motor shaft, a drive belt connecting the pulleys, the construction and arrangement avoiding vibratory effects from the drive belt and permitting the frame with the motor drive to be supported and enclosed by a light sheet metal cabinet on a wheel base and successfully operated on non-level floors.

CHARLES R. STOUT.